United States Patent
Langlais et al.

(10) Patent No.: US 8,235,701 B2
(45) Date of Patent: Aug. 7, 2012

(54) ADJUSTMENT MECHANISM FOR EXTRUSION DIE

(75) Inventors: Michael Ernest Langlais, Coventry, RI (US); Richard Roy Guillemette, West Warwick, RI (US)

(73) Assignee: Guill Tool & Engineering Co., Inc., West Warwick, RI (US)

( * ) Notice: Subject to any disclaimer, the term of this patent is extended or adjusted under 35 U.S.C. 154(b) by 401 days.

(21) Appl. No.: 12/456,607

(22) Filed: Jun. 20, 2009

(65) Prior Publication Data

US 2010/0323049 A1 Dec. 23, 2010

(51) Int. Cl.
*B29C 47/22* (2006.01)
(52) U.S. Cl. ............... 425/192 R; 425/381; 425/466
(58) Field of Classification Search ............ 425/192 R, 425/381, 466
See application file for complete search history.

(56) References Cited

U.S. PATENT DOCUMENTS

| | | | | |
|---|---|---|---|---|
| 2,321,338 A | * | 6/1943 | Ulanet | 337/360 |
| 2,387,718 A | * | 10/1945 | Coleman | 425/466 |
| 4,212,620 A | * | 7/1980 | McLaren | 425/381 |
| 5,785,920 A | * | 7/1998 | Ogawa et al. | 264/515 |
| 6,214,268 B1 | * | 4/2001 | Ogawa | 264/171.26 |
| 638,294 A1 | | 5/2002 | Guillemette | |
| 689,016 A1 | | 5/2005 | Guillemette et al. | |
| 690,238 A1 | | 6/2005 | Guillemette et al. | |

* cited by examiner

*Primary Examiner* — Yogendra Gupta
*Assistant Examiner* — Joseph Leyson
(74) *Attorney, Agent, or Firm* — Ziegler IP Law Group, LLC

(57) ABSTRACT

A device is constructed for adjusting the concentricity of a die within an extrusion die assembly. The adjustment mechanism involves a series of compound screws having multiple operating threads that employ different pitches to generate a fine adjustment motion. The compound screws are coupled to opposing spring loaded plungers that move against a bias spring in reaction to movement of the compound screws.

11 Claims, 6 Drawing Sheets

SECTION A-A

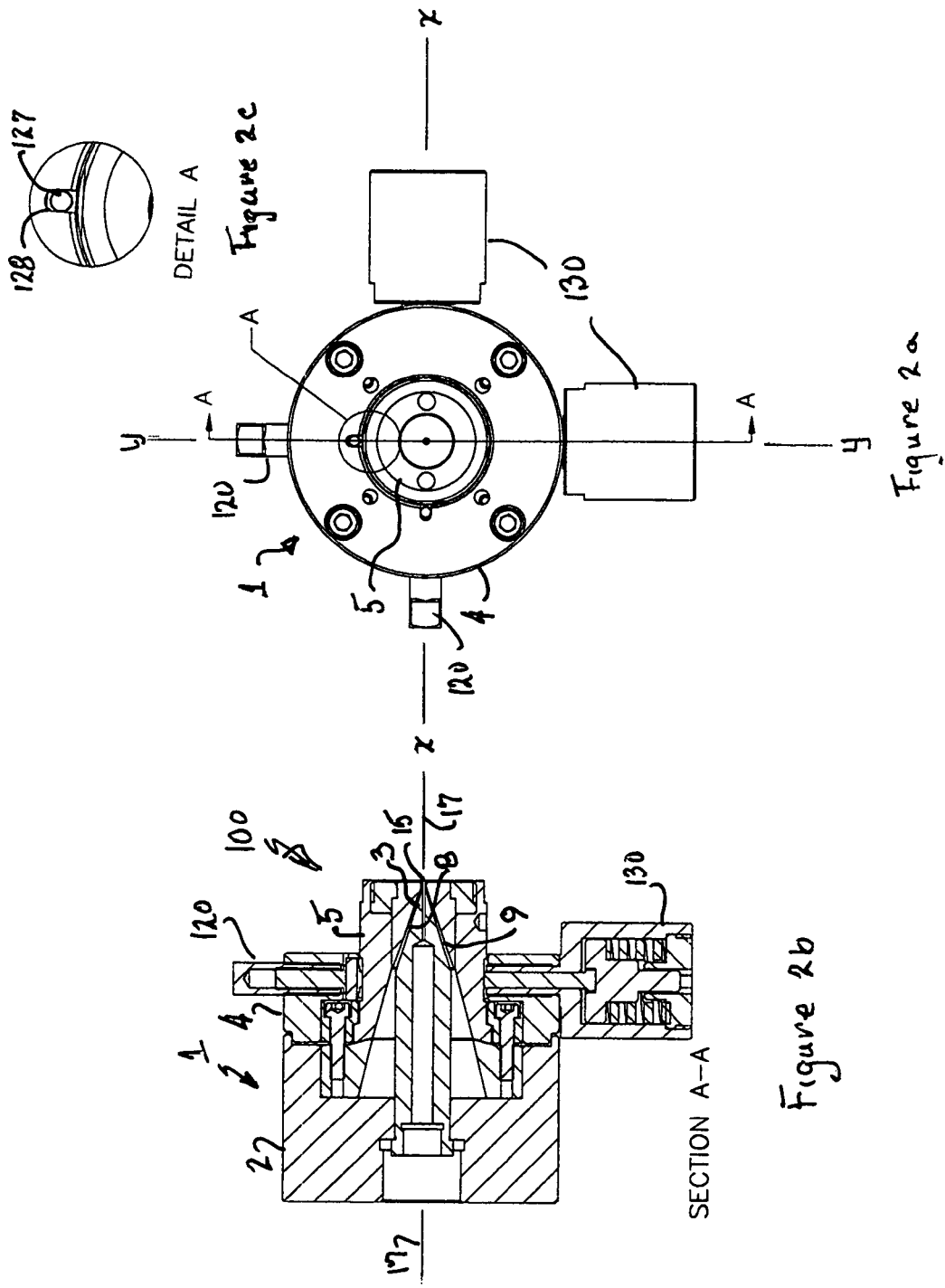

DETAIL L

SECTION K-K

ADJUSTMENT MECHANISM FOR EXTRUSION DIE

BACKGROUND OF THE INVENTION

Extrusion dies are frequently used to provide a tubular coating to a wire or other product which presents a generally cylindrical substrate. A typical die assembly 1 for performing this function is shown in FIG. 1. The basic assembly 1 consists of a die body 2, a tip 3, a die retainer 4, and a die 5. The tip 3 is mounted within an axial bore of the die body 2 and is itself constructed with an axial bore 7 having a downstream exit portion 8. In operation, a wire, or other tubular or profile product (not shown) is fed through bores 7 and 8 to exit axially at 15. An annular extrusion passage 9, surrounds exit 15, and is positioned to receive flowing plastic and apply it, in a tubular layer, to the product as it leaves exit 15. In some instances air may be blown through axial bore 7 to allow the formation of a hollow tubular part, accurate concentricity is still a critical requirement.

The die assembly 1 is an assembly of machined parts, each having its own manufacturing tolerance. These tolerances tend to multiply with the assembly of the components. It is therefore a difficult task to maintain the desired coaxial relationship between the product and the extruded layer to a particular tolerance. An adjustment mechanism is generally needed to insure concentricity of the die and pin, so as to provide an even thickness of the applied layer. This is generally accomplished simply by mounting the die retainer 4 for adjustment, along x and y coordinates (see FIG. 1a). The adjustment may be actuated through adjusting screws 12a, b, c, d. As shown in FIGS. 1a and 1b, the adjustment motion is radially towards and away from the axis 17, of the assembly 1. It should be noted that in the adjustment process of the prior art, as a torque is applied to an adjustment screw 12a, adjustment screw 12c must be backed off to allow movement of the die in the y direction. This also occurs when adjusting in the x direction. With this system of adjustment screws, the sensitivity of the adjustment mechanism is limited by the maximum thread density that can be machined.

It is a purpose of this invention to provide a simple mechanism for adjusting the relative position of the die with respect to the tip to apply a consistently concentric layer of plastic about the circumference of a tubular product, while reducing the torque required to adjust the position. Another purpose of the invention is to improve the accuracy of die adjustment in other die assemblies. It is another purpose of this invention to provide a module which incorporates the adjustment mechanism into an easily assembled component of the extrusion die assembly. A further object of the invention is to increase the sensitivity and accuracy of the concentricity adjustment.

SUMMARY OF THE INVENTION

The die assembly of this invention may be used as part of a cross head die which receives molten plastic from an extruder from a direction that is transverse to the longitudinal axis of the assembly. The plastic must then be turned to flow downstream axially towards an annular tapered extrusion channel. It could also be used in association with an inline die configuration in which the plastic flows axially. Although the invention will be described in the context of a die for extruding a tubular product, the adjustment mechanism of this application is useful in any extrusion die system in which accurate adjustment of die position is needed.

In order to apply a cylindrical layer of consistent radial depth or to provide a tubular product of continuous thickness, the position of the die relative to the tip must be precise. Since it is difficult to maintain positioning accuracy within acceptable tolerances during assembly of the components, an adjustment mechanism is provided which allows the relative position of die and tip to be adjusted after assembly.

The embodiments of the adjustment mechanism of this application may be used in a wide variety of die assemblies which are constructed to permit adjustment of the relative position of a die within a die assembly. An example of such a system is described in U.S. Pat. No. 6,902,388, the disclosure of which is incorporated herein by reference. Die assemblies of this type are particularly adaptable to the adjustment mechanism of this application and will be used herein to describe the adjustment mechanism, with the understanding that the subject invention is not limited to a particular die configuration.

A die assembly of this type is constructed with a recess at its downstream end to receive the die holder which supports the die in a fixed relation. The die holder is mounted within an upstream and a downstream mounting ring to form an adjustment module. The mounting rings are constructed having partial hemispherical surfaces which, in the assembled position, are concentric. The upstream hemispherical surface has a radius which is less than the downstream hemispherical surface. This results in the assembled rings forming a space, having opposing parallel hemispherical surfaces, which form a seat within which the die holder is engaged. The die holder is constructed with upstream and downstream partial hemispherical surfaces having the same curvatures as the respective surfaces within the seat formed by the mounting rings. These mating surfaces form an adjustment interface between the die holder and the die body. The center of curvature of these surfaces are located upstream of the die holder and provides a pivot point for movement of the die holder in the seat. The die holder and die holder seat, therefore, engage and operationally cooperate to provide an adjustment motion of the die holder within the die body that is a substantially universal motion.

As shown in FIGS. 1a and 1b, the prior art systems generally actuate the adjustment through adjusting screws provided in the die body. These screws engage the die or die holder at a position downstream from a pivot at the mounting interface. This distance should be sufficient to provide a mechanical advantage, i.e. a lever arm for operation of the adjustment screws on the die. This mechanical advantage depends on the configuration of the die assembly, but will contribute to the amount of torque required to turn the adjusting screws. In this manner the die and tip may be accurately maintained in a concentric relation within significantly improved tolerances and reduced backlash.

The adjustment mechanism of this application utilizes combinations of compound adjustment screw systems and spring loaded plunger elements. In one embodiment a compound adjustment screw is mounted on a die retainer for applying a force to the die with an opposing spring loaded plunger mounted on the die retainer for engaging the die with a spring biased force opposite to the force applied by the compound adjustment screw. The spring loaded plunger is constructed to provide a spring biased force that automatically responds to the force applied by the compound adjustment screw to allow movement of the die into concentric alignment with the axis of the die assembly. The spring loaded plunger, therefore, permits the adjustment to be accomplished by the adjustment of one adjustment screw in each of the x and y directions instead of the four screws of the prior art.

The compound adjustment screw is an assembly of screw elements having different pitches. A first or primary screw element is constructed having an external thread for engagement with a threaded bore in the die retainer. The first screw element is also constructed with an internal threaded bore into which a second screw element is engaged. The second screw element is contained in the bore of the die retainer in a position radially inward from the first screw element. The second screw element is locked from rotation within the die retainer bore and extends inward from the first screw element to engage the die. The second screw element moves with the first screw element to form a pusher that operates to transmit a radially directed force against the die as a torque is applied to the first screw element. The external thread and the internal thread of the first screw element are designed with different thread pitches that cooperate to provide a sensitive adjustment of the die to accomplish an improved accuracy in the adjustment of die concentricity.

The spring loaded plunger is constructed as a piston mounted in a bore of the die retainer and extending radially inward to engage the die in an opposing relation to the compound adjustment screw. The piston is moveable within the bore of the die. A spring engages the piston to bias the plunger movement radially inward to compensate for backlash in the adjustment system.

In operation the compound adjustment screw provides a more sensitive, fine adjustment of the position of the die within the die retainer in cooperation with the spring loaded plunger, while the plunger backs off in the opposite direction from the adjustment force applied by the compound adjustment screw.

In some embodiments in may be advantageous to utilize four opposing compound adjustment screws without the spring loaded plungers. In another embodiment the spring loaded plungers could be used in combination with a single threaded adjustment screws. In another embodiment a meter or other indicator could be mounted in cooperation with the spring loaded plunger to provide a visual indication of the adjustment operation.

DESCRIPTION OF THE DRAWINGS

The invention of this application is described in more detail below with reference to the Drawing in which:

FIG. 1b is a sectional view of the extrusion die assembly of FIG. 1a taken along section lines B-B of FIG. 1a;

FIG. 2a is a front view of an extrusion die assembly showing an embodiment of an adjustment mechanism constructed according to this invention;

FIG. 2b is a sectional view of the extrusion die assembly of FIG. 2a taken along section lines A-A of FIG. 2a;

FIG. 2c is an enlarged view of detail A of FIG. 2a.

FIG. 5b is a perspective view of the embodiment of FIG. 5a;

FIG. 6c is an enlarged view of detail L of FIG. 6a;

DESCRIPTION OF THE PREFERRED EMBODIMENT

Figure 1A:
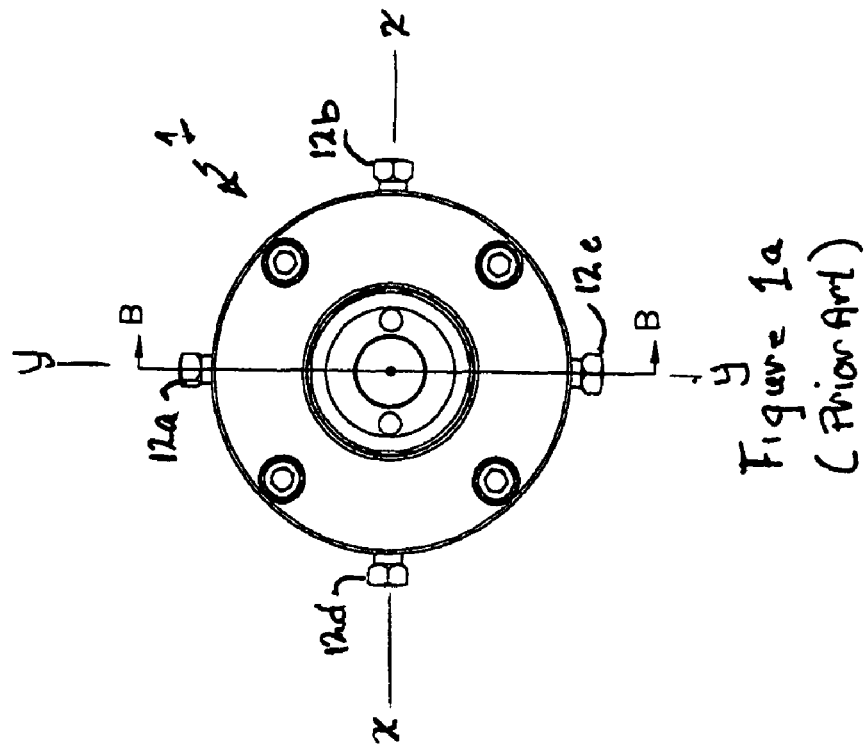
FIG. 1a is a front view of a die assembly showing a typical adjustment mechanism of the prior art.
Figure 1B:
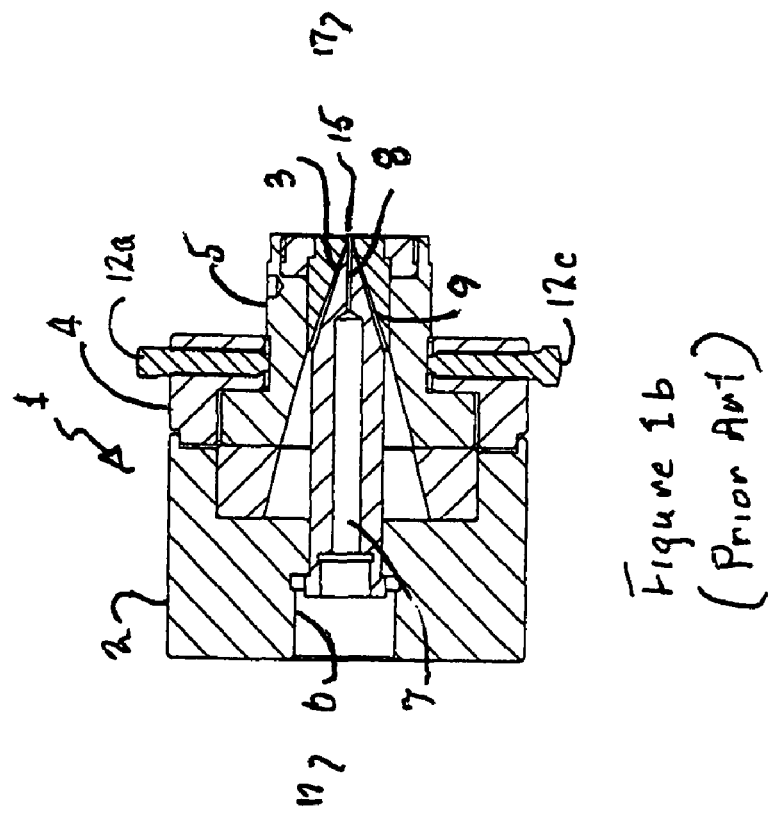

An extrusion die assembly 1, constructed in accordance with an embodiment of the subject invention, is shown in FIGS. 2a and 2b. The adjustment mechanism 100 is shown in the context of a die assembly 1. Die assembly 1 receives plastic from an extruder outlet (not shown) and supplies it to a tapered annular extrusion channel 9 where it is extruded. The general function of the die head assembly 1 is to receive flowing plastic at an upstream inlet and distribute it to downstream outlet 15 in a flow pattern that is evenly dispersed about the extrusion channel 9.

Extrusion die assembly 1 consists of components, which are assembled in alignment with the axis 17 and cooperate to form an extrusion channel 9. Die body 2 is a generally cylindrical element having an internal axial bore 6 with openings at its upstream and downstream ends. A tip 3 is assembled within the bore 6 and extends to the outlet 15 at the downstream end of the die body 2. Die 5 is mounted within the bore 6 and cooperates with the body 2 to allow die 5 to pivot at its downstream end. An example of a particularly useful die configuration that provides such pivot motion with an extended lever arm is described in U.S. Pat. No. 6,902,388 referenced above.

As illustrated in the figures, the exit 15 of the extrusion channel 9 is formed by the cooperation of the die 5 and the tip 3. The dimensions and configuration of the exit 15 are dependent on the relative position of these members. Tip 3 may be constructed with an axial bore 7 having a downstream end 8 to provide a passage through which a tubular product, such as a wire, may be passed to receive a layer of plastic issuing from extrusion passage 9. In order to deposit a cylindrical layer of plastic on an elongated product in a uniform thickness, the die 5 and tip 3 must be positioned concentrically. The components of the die assembly may be secured in the assembled position by a die retainer 4. Die retainer 4 may be attached to the die body 2 by means of threads or by bolts. As shown in the figures die 5 is an assembly of two parts and includes die holder that acts to secure the die. To simply this description die 5 is used to refer to the composite die shown, since for the purposes of adjustment they operate as one unit.

Because of the accumulated tolerance errors within the assembly 1, it is necessary to provide a means by which the concentric position of the die 5 may be adjusted with respect to the pin 3. The overall motion required for adjustment is small. To provide this motion, an adjustment mechanism 100 is constructed for positioning die 5 in body 2. A first embodiment of mechanism 100 is shown in FIGS. 2a and 2b.

The adjustment mechanism of this application is useful in any extrusion die system in which accurate adjustment is needed and die movement is possible. The die configuration of the '388 patent is used only as an example, but may be particularly useful because of the mechanical advantage that it provides.

The adjustment mechanism 100, is basically constructed with combinations of compound screw adjustment systems 120 and spring loaded plunger elements 130. In a first embodiment, as shown in FIGS. 2a and 2b, a pair of compound screw adjustment systems 120 is mounted on die retainer 4. the compound screw adjustment systems 120 extend radially inward into engagement with die 5, each of the compound screw adjustment systems applying a force to die 5 in one direction, for example the x and y direction, as shown. A pair of spring loaded plungers 130 is mounted on the die retainer 4 for applying a force opposite to the force applied by the compound screw adjustment systems 120. The spring loaded plunger 130 is constructed to provide a spring biased force that automatically responds to the force applied by the compound screw adjustment systems 120 to allow movement of the die 5 into accurate alignment with the axis 17 of the die assembly 1. The spring loaded plunger 130 operates to allow the adjustment of the die 5 by adjusting a compound screw adjustment system 120 in each of the x and y directions instead of adjusting four opposing screws, as provided by the adjustment mechanisms of the prior art and this is accomplish while virtually eliminating backlash in the adjustment system.

Figure 3:
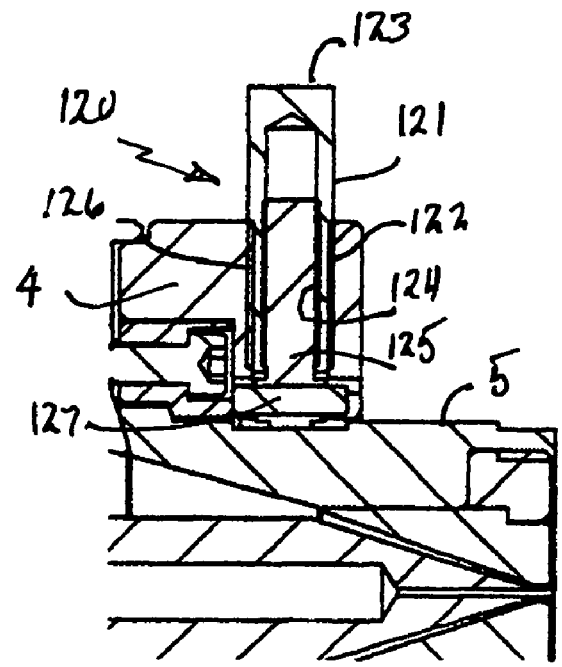
FIG. 3 is an enlarged sectional view of an embodiment of the screw adjustment mechanism of FIGS. 2a and 2b.

One embodiment of a compound screw adjustment systems 120 is shown in FIG. 3 and consists of an assembly of screw elements having different pitches. A primary screw element 121 is constructed having an external thread 122 for engagement with a threaded bore 126 in the die retainer 4.

Primary screw element 121 is externally accessible and is constructed with a drive head 123 for receiving a tool through which a torque may be applied to turn the primary screw element on its external threads 122. Primary screw element 121 is also constructed with an internal bore having internal threads 124 into which a pusher element 125 is engaged. Pusher element 125 is connected to primary screw element 121 by means of matching threads and operates as an extension of primary screw element 121 within bore 126 of the die retainer 4. Pusher element 125 extends radially inward from primary screw element 121. Pusher element 125 is locked from rotation within the die retainer bore 126 and extends inward to engage die 5. To lock pusher element 125, a key 127, as shown in FIG. 2c, is constructed to engage pusher element 125. Key 127 is mounted in the die retainer 4 in a slot 128 that permits a predetermined amount of inward movement of the primary screw element and pusher element assembly, depending on the amount of adjustment that may be needed. Pusher element 125 moves with the primary screw element 121 to transmit an inward directed force against the die 5 as a torque is applied to primary screw element 121.

External threads 122 and the internal threads 124 of the primary screw element are designed with different thread pitches that cooperate to provide a sensitive, fine adjustment of the die to accomplish an improved accuracy in the adjustment of die, in particularly concentricity. It should be apparent to one skilled in the art that there may be further applications of the subject adjustment mechanism in die configurations that are not designed for tubular shaped products but other odd shaped products formed by a profile die.

In one embodiment of the primary screw element 121, both threads 122 and 124 have right hand threads that cooperate to provide a motion relative to the difference between external thread pitch and internal thread pitch. By adjusting the relative pitch of the external and internal threads a wide variety of motions can be affected, for example, the magnitude and direction of motion can be adjusted. If the internal thread of the primary screw element 121 is constructed as a left hand thread for cooperation with the right handed primary thread, the threads will cooperate to provide a motion relative to the sum of the pitches. The latter relative pitch selection may useful in applications in which coarser adjustment is desired. In general, in the operation of the adjustment mechanism 121, right hand threads are used with the internal threads having a finer pitch than the external thread. In most instances, the pitches are selected so that the external thread pitch minus the internal thread pitch is a positive value, i.e. both primary screw element 121 and the pusher element 125 move in the same direction. It is observed that with this arrangement a substantially infinite range of adjustments are made available, especially when compared to the single threaded adjustment screws used in prior systems, which are inherently confined to the limits of a machined thread.

Figure 4:
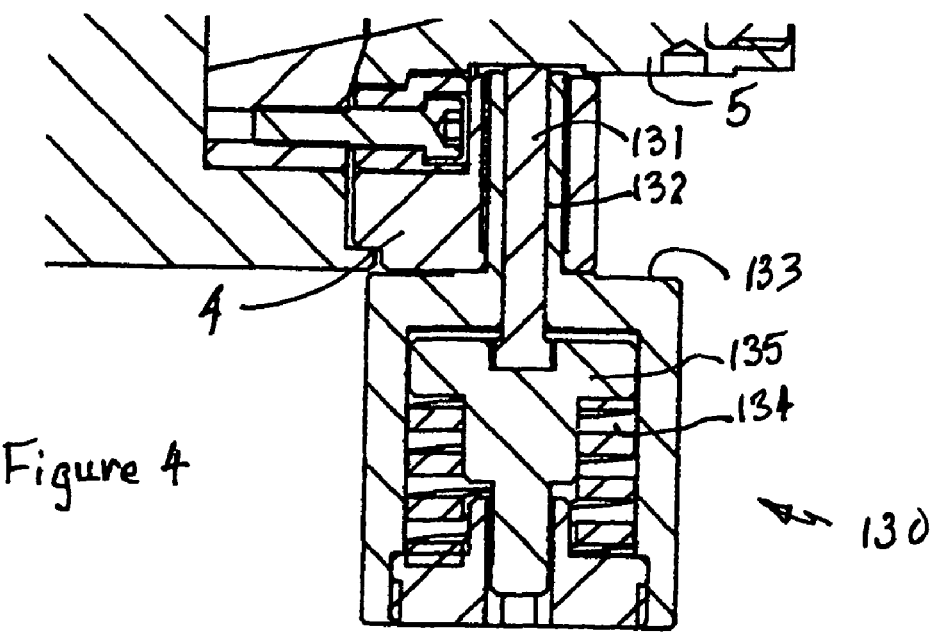
FIG. 4 is an enlarged sectional view of an embodiment of the spring loaded pusher of FIGS. 2a and 2b.

An embodiment of spring loaded plunger 130 is shown in FIG. 4. Spring loaded plunger 130 is constructed having a piston 131 slidably mounted in a bore 132 of the die retainer 4 and extending radially inward to engage the die 5 in an opposing relation to the pusher element 125 of compound adjustment screw 121. Piston 131 extends outward from die retainer 4 into spring housing 133 mounted externally to die retainer 4. Spring 134 is contained within spring housing 133 and engages piston base 135 connected to piston 131. In one embodiment spring 134 is compressed to provide a radial force against piston base 135 to bias movement of piston 133 radially inward. The spring loaded plunger eliminates backlash within the adjustment mechanism whether or not the compound adjustment screw is used.

Figure 7A:
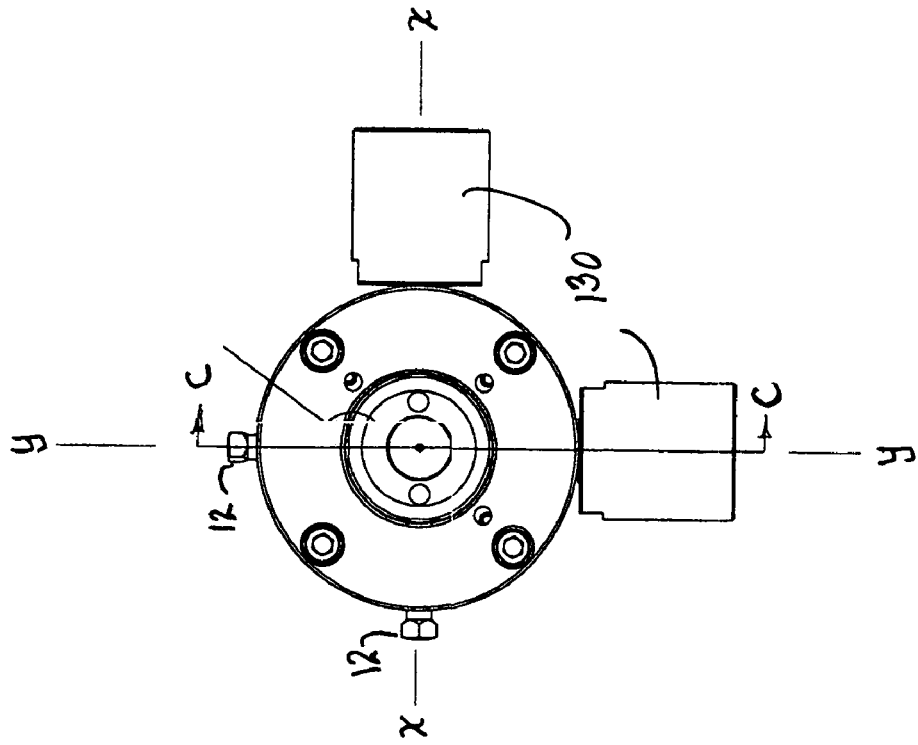
FIG. 7a is a front view of an extrusion die assembly showing another alternate embodiment of the subject invention.
Figure 7B:
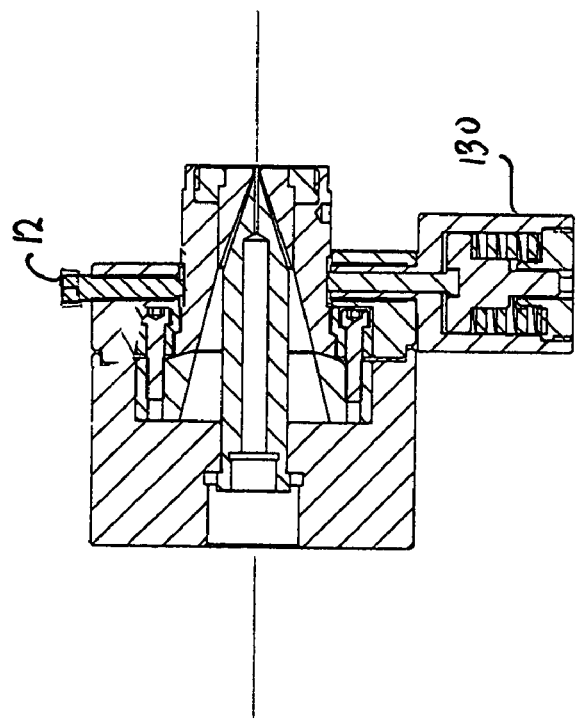
FIG. 7b is a sectional view of the embodiment of FIG. 7a, taken along section lines C-C.

In another embodiment, as shown in FIGS. 7a and 7b, the spring loaded plunger 130 operates in cooperation with a standard single thread adjustment screw 12. Although the ultra fine adjustment of other embodiments is lost, this adjustment mechanism may be advantageous to simplify the adjustment process and eliminate backlash in the adjustment mechanism. This arrangement still as the advantage or reducing the number of adjustment operations required, i.e., from four to two.

In operation, the rotation of the compound adjustment screws 121 provide a fine adjustment of the concentricity of the die 5 relative to pin 3 within die retainer 4. Spring loaded plunger 130 is coupled with a compound adjustment screw 121 to automatically back off or move inward in response to movement of its corresponding compound adjustment screw 121. Movement of piston 131 is in the opposite direction from the adjustment force applied by the compound adjustment screw 121. Operation in this manner eliminates the need to adjust four opposing adjustment bolts as in the prior art and eliminates backlash within the adjustment mechanism 100.

Figure 5B:
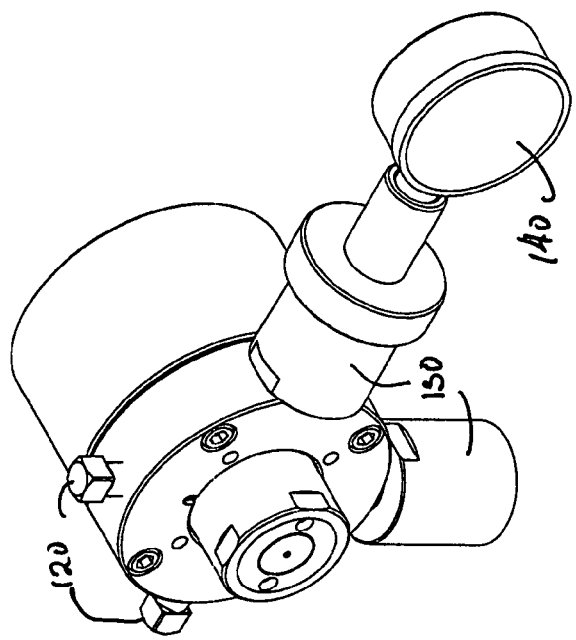
Figure 5A:
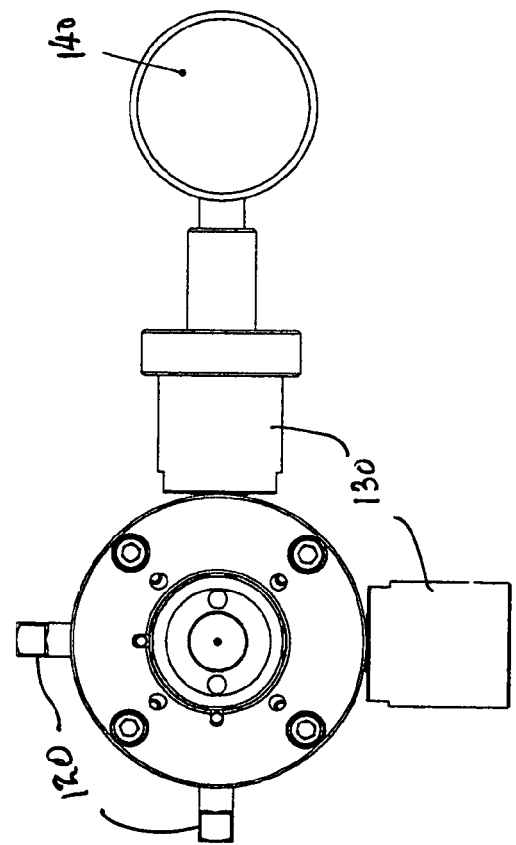
FIG. 5a is a side view of the embodiment of FIGS. 2a and 2b having an indicator coupled to the spring loaded pusher of FIGS. 2a and 2b.

A further embodiment of the adjustment mechanism is shown in FIGS. 5a and 5b in which the movement of the spring loaded plunger 130 is coupled to a gauge 140. Gauge 140 may be calibrated to provide an indication of certain adjustment parameters, for example, force or distance.

Figure 6A:
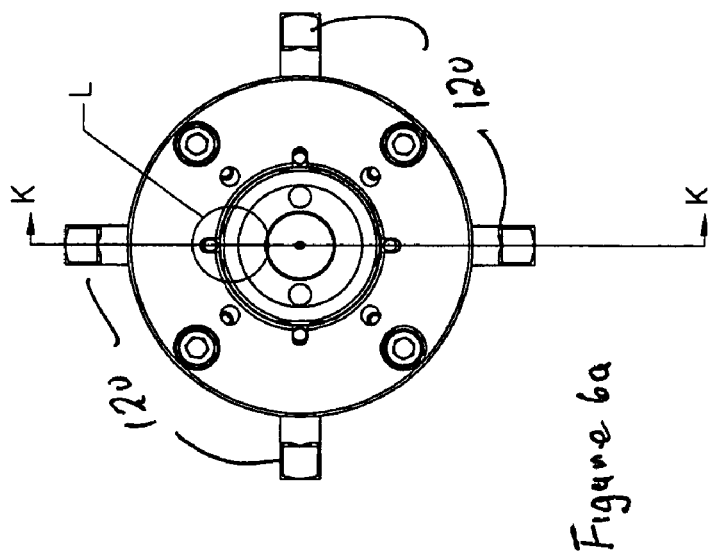
FIG. 6a is a front view of an extrusion die assembly showing an alternate embodiment of the subject invention.
Figure 6C:
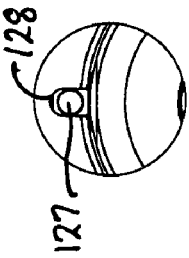
Figure 6B:
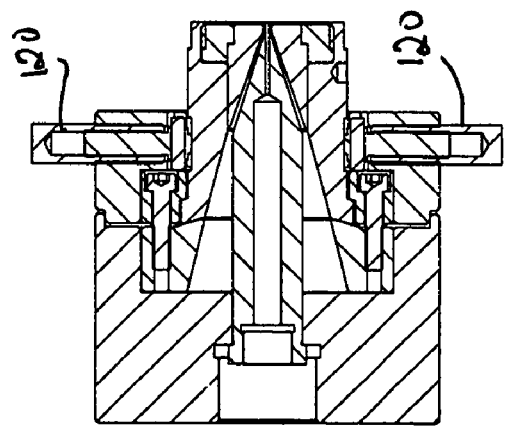
FIG. 6b is a sectional view of the embodiment of FIG. 6a, taken along section lines k-k.

A further embodiment of the adjustment mechanism is shown in FIGS. 6a and 6b in which four compound adjustment screws are mounted in opposing directions without resort to the spring loaded plungers. This configuration will provide a sensitive and accurate adjustment of concentricity in a limited spatial envelope.

Although the figures illustrate embodiments using a four axis adjustment system, it may advantageous in some applications to provide additional axes of adjustment, in particular where large die components are present.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. Apparatus comprising:
a die mounted, in an extrusion die assembly having a central axis, said die being mounted in a coaxial relation with the central axis and displaced outward from the central axis to define a passage for the flow of material, the die further being mounted for movement to allow adjustment of the die with respect to the central axis;
a die retainer configured to engage the die and secure the die in the extrusion die assembly;
at least one compound screw adjustment assembly mounted in the die retainer configured to apply a force to the die in a first inward direction; and
at least one spring loaded plunger mounted in the die retainer to apply a spring biased force on the die in a second inward direction opposite to the first inward direction, said spring biased force being weaker than the force exerted by the compound screw adjustment assembly so that movement of the die is allowed as the compound screw applies a force that exceeds the spring biased force,
wherein the compound screw adjustment assembly comprises:
a primary screw element constructed with an external thread for engagement with a matching thread constructed in an inward extending bore in the die retainer, the primary screw element is adapted to be engaged in the bore for movement in an inward direction as the primary screw element is rotated in threaded engagement with the die retainer bore, the primary screw element having an outer end accessible by a tool for applying a torque to the primary screw element and an inward extending end, said primary screw element further having an internal thread formed in a bore constructed in the inward extending end;
a pusher element mounted in threaded engagement with said internal threads of said primary screw element to provide an inward extension of the primary screw element for engagement with the die, the pusher element comprising a locking mechanism configured to prevent rotation in the die retainer bore,
wherein said external thread and said internal thread are constructed with a first and a second pitch respectively and wherein said first and second pitches are different and selected to allow relative motion of the primary screw element and the pusher element, and
wherein said first and second pitches are further selected to provide a positive motion of the compound screw adjustment assembly toward the die, and
wherein said locking mechanism comprises a key fixedly attached to said pusher element and configured to engage a slot formed in the die retainer bore.

2. The apparatus according to claim 1, wherein the spring loaded plunger further comprises:
a housing mounted externally on the die retainer;
a piston mounted for movement in the housing and extending outward therefrom into an inward extending plunger bore constructed in the die retainer; and
a bias spring mounted in the housing in engagement with the piston to force the piston against the die and exert the spring biased force on the die.

3. The apparatus according to claim 1, wherein the external thread and the internal threads are right hand threads and the first pitch and the second pitch are selected so that their difference is a positive value.

4. The apparatus according to claim 1, wherein the external thread is a right hand thread and the internal thread is left hand thread and the first pitch and the second pitch are selected so that their sum is a positive value.

5. The apparatus according to claim 1, further comprising a gauge coupled to the spring loaded plunger, wherein the gauge is calibrated to provide an indication of an adjustment parameter.

6. The apparatus according to claim 1 wherein the pusher element is locked from rotation in the die retainer bore by a pin that engages a slot in the die retainer and wherein the slot is sized to permit inward movement of the pusher element in the bore.

7. The apparatus according to claim 1, wherein said at least one compound adjustment screw further comprises first and second compound adjustment screws, mounted on the die retainer to exert forces on the die in first and second directions respectively, and wherein said first and second directions are perpendicular to each other; and
further wherein said at least one spring loaded plunger comprises first and second spring loaded plungers mounted on the die retainer to exert forces on the die in directions opposite to said first and second directions.

8. The apparatus according to claim 1, wherein the extrusion die assembly is configured to extrude a tubular product, and wherein the extrusion die assembly comprises a tip axially positioned therein and wherein the die is positioned coaxially with the tip.

9. Apparatus comprising:
a die mounted in an extrusion die assembly having a central axis, the die mounted in the extrusion die assembly in a coaxial relation with the central axis and displaced outward from the central axis to define a passage for the flow of material, the die mounted for movement to allow adjustment of the die with respect to the central axis;
a die retainer configured to engage the die and secure the die in the extrusion die assembly;
a first and a second compound screw adjustment assemblies mounted in the die retainer to exert forces on the die in a first direction and a second direction respectively, wherein said first and second directions are perpendicular to each other;
a third and a fourth compound screw adjustment assemblies mounted in the die retainer to apply forces in directions opposite to said first and second directions,
wherein each of said third and fourth adjustment assemblies are backed off to allow the first and second compound screw adjustment assemblies to operate to move the die,
wherein each of the compound screw adjustment assemblies further comprises:
a primary screw element constructed with an external thread for engagement with a matching thread constructed in an inward extending bore in the die retainer, the primary screw element is adapted to be engaged in the bore for movement in inward direction as the primary screw element is rotated in threaded engagement with the die retainer bore, the primary screw element having an outer end accessible by a tool for applying a torque to the primary screw element and an inward extending end, the primary screw element further having an internal thread formed in a bore constructed in the inward extending end;
a pusher element mounted in threaded engagement with said internal threads of said primary screw element to provide an inward extension of the primary screw element for engagement with the die, the pusher element comprising a locking mechanism configured to prevent rotation in the die retainer bore, wherein said external thread and said internal thread are constructed with a first and a second pitch respectively and wherein said first and second pitches are different and selected to allow relative motion of the primary screw element and the pusher element, and wherein said first and second pitches are further selected to provide a positive motion of the compound screw adjustment assembly toward the die, and wherein said locking mechanism comprises a key fixedly attached to said pusher element and configured to engage a slot formed in the die retainer bore.

10. The apparatus according to claim 1, wherein the slot is configured to permit a predetermined amount of inward movement of the pusher element.

11. The apparatus according to claim 9, wherein the slot is configured to permit a predetermined amount of inward movement of the pusher element.

* * * * *